(12) United States Patent
Hamada et al.

(10) Patent No.: US 7,393,611 B2
(45) Date of Patent: Jul. 1, 2008

(54) SEALED RECHARGEABLE BATTERY AND BATTERY MODULE

(75) Inventors: Shinji Hamada, Toyohashi (JP); Toyohiko Eto, Toyota (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 499 days.

(21) Appl. No.: 10/667,770

(22) Filed: Sep. 22, 2003

(65) Prior Publication Data
US 2004/0131932 A1 Jul. 8, 2004

(30) Foreign Application Priority Data
Sep. 20, 2002 (JP) ............................. 2002-274800

(51) Int. Cl.
*H01M 2/26* (2006.01)
(52) U.S. Cl. ....................................... 429/163; 429/169

(58) Field of Classification Search ................. 429/122, 429/143, 149, 151, 162, 163, 168, 171
See application file for complete search history.

(56) References Cited

U.S. PATENT DOCUMENTS

| 4,865,932 | A | * | 9/1989 | Masuda et al. | 429/213 |
| 5,663,007 | A | * | 9/1997 | Ikoma et al. | 429/53 |
| 5,747,186 | A | * | 5/1998 | Morishita et al. | 429/53 |
| 6,806,003 | B1 | * | 10/2004 | Yamaguchi et al. | 429/232 |
| 2003/0027040 | A1 | * | 2/2003 | Asahina et al. | 429/159 |

FOREIGN PATENT DOCUMENTS

JP 2001-283793 10/2001

* cited by examiner

*Primary Examiner*—Susy Tsang-Foster
*Assistant Examiner*—Alix Echelmeyer
(74) *Attorney, Agent, or Firm*—Jordan and Hamburg LLP

(57) ABSTRACT

A sealed rechargeable battery includes: a metal case having an elliptical or rectangular cross section; a metal sealing plate for sealing an opening at one end of the case; and an electrode plate assembly being housed in the case with an electrolyte solution. In this configuration, a plurality of projecting ridges are formed in a continuous or discontinuous manner on both longer side faces of the case between a bottom face and the opening so as to enhance the cooling performance and to improve the strength of the side faces of the case.

15 Claims, 10 Drawing Sheets

SEALED RECHARGEABLE BATTERY AND BATTERY MODULE

The present disclosure relates to subject matter contained in priority Japanese Patent Application No. 2002-274800, filed on Sep. 20, 2002, the contents of which is herein expressly incorporated by reference in its entirety.

BACKGROUND OF THE INVENTION

1. Field of the Invention

The present invention relates to a sealed rechargeable battery and a battery module, in particular, to a sealed rechargeable battery constituted by housing an electrode plate assembly in a metal case having an elliptical or a rectangular cross section and a battery module constituted by connecting the sealed rechargeable batteries in series.

2. Description of Related Art

As a sealed rechargeable battery used as a power source for electric vehicle and hybrid car, a lithium ion rechargeable battery or a nickel metal hydride battery has been put into practical use.

Figure 12:
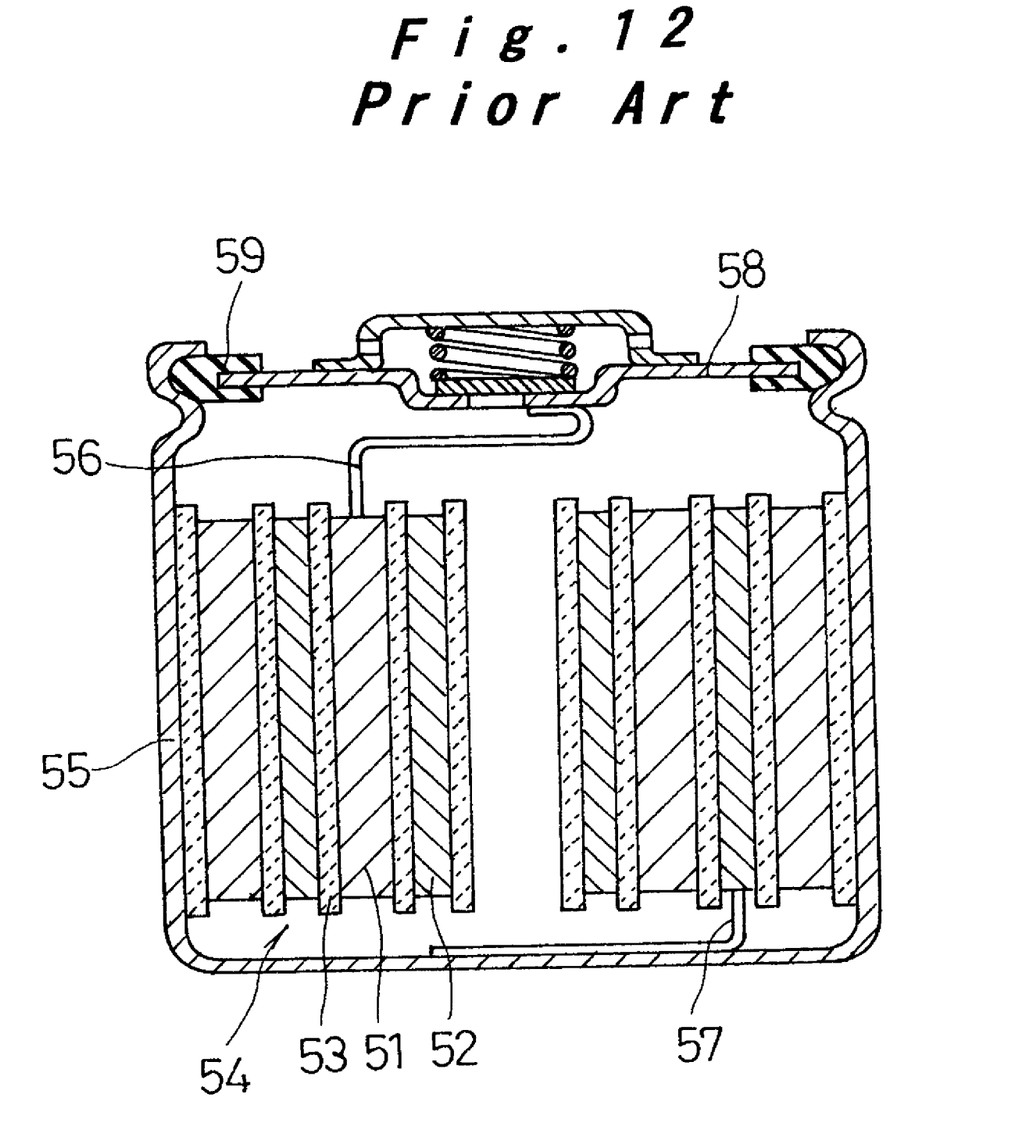
FIG. 12 is a vertical sectional view of a conventional sealed rechargeable battery.

As this type of sealed rechargeable battery, a sealed rechargeable battery having the following structure is conventionally known. As shown in FIG. 12, an electrode plate assembly 54, in which a band-like positive electrode plate 51 and a band-like negative electrode plate 52 are spirally wound with a separator 53 interposed therebetween, is housed in a cylindrical metal case 55 together with an electrolyte solution. A positive electrode tab 56 and a negative electrode tab 57 are extended from the positive electrode plate 51 and the negative electrode plate 52 towards the sides opposite to each other. The negative electrode tab 57, which is downwardly extended, is welded to the bottom face of the case 55, whereas the positive electrode tab 56, which is upwardly extended, is welded to a sealing plate 58 for sealing an opening of the case 55. The sealing plate 58 is fixed to seal the opening of the case 55 with a gasket 59 interposed therebetween.

With the structure as shown in FIG. 12, however, a connection resistance is large because the positive electrode plate 51 is connected to the sealing plate 58 through the positive electrode tab 56 whereas the negative electrode plate 52 is connected to the case 55 through the negative electrode tab 57. As a result, an internal resistance of the battery is increased to degrade the output characteristics and the high-current discharge characteristics. What is worse, since the number of components and the number of assembly steps are both increased, the component cost and the fabrication cost are increased.

Furthermore, since the case 55 is cylindrical, the number of batteries that can be housed in a certain volume is small. Particularly, if a cooling path is formed between the batteries so as to prevent a rise in a battery temperature, the space efficiency is further decreased. Moreover, since the case 55 has a circular cross section, the cooling performance for the central portion of the battery is low, resulting in poor volume efficiency per battery output.

In order to solve the above-mentioned problems, the applicants of the present invention have proposed a battery module having the following structure. A prismatic battery container made of synthetic resin is constituted by integrally connecting a plurality of prismatic battery cases so as to share their shorter side faces. In each battery case, an electrode plate assembly is housed with an electrolyte solution to constitute a cell. Then, the cells are connected to each other in series in the prismatic battery container.

With the prismatic battery container made of synthetic resin, however, it is not possible to perfectly prevent a gas leak from the battery in the long term, resulting in lowered battery performance. Moreover, since the synthetic resin does not have a high thermal conductivity, the cooling efficiency of the battery is low, limiting the increase in output. What is worse, since both sides of the battery container are expanded by an internal pressure generated in each cell, it is necessary to place end plates on both ends of the battery module and to bind the end plates with a rod or a band. As a result, the battery module is increased in size as well as in cost.

SUMMARY OF THE INVENTION

In light of the above conventional problems, the present invention has an object of providing a sealed rechargeable battery and a battery module with high volume efficiency per battery output, whose lifetime and output are both increased.

A sealed rechargeable battery according to the present invention, includes: a metal case having an elliptical or rectangular cross section; a metal sealing plate for sealing an opening at one end of the case; and an electrode plate assembly being housed in the case together with an electrolyte solution, wherein a plurality of continuous or discontinuous projecting ridges are provided between a bottom face and the opening on both longer side faces of the case. Since the cross section of the case is elliptical or rectangular, a larger number of the batteries can be housed in a certain volume as compared with a battery having a circular cross section in a case where a plurality of the batteries are arranged with cooling paths being formed between the respective batteries. At the same time, since each battery is efficiently cooled to its central portion, volume efficiency is increased per battery output. Moreover, since the metal case and the metal sealing plate are used, a gas leak is perfectly prevented even in a long-term use, thereby achieving longer lifetime of the battery. Since the metal case has a high thermal conductivity and a heat transfer surface area is increased by forming the projecting ridges on the side faces of the case, the battery is efficiently cooled to achieve a higher output. Simultaneously, the projecting ridges allow the strength of the side faces of the case to be improved. As a result, the side faces are prevented from being expanded due to an internal pressure of the battery.

Preferably, the electrode plate assembly is constituted by laminating a positive electrode plate and a negative electrode plate with a separator interposed therebetween so that a core substrate of the positive electrode plate and that of the negative electrode plate project to sides opposite to each other; both end faces of the electrode plate assembly, constituted by edges of the core substrates of the positive and negative electrode plates, are connected to a bottom face of the case and the sealing plate; and an insulating gasket is interposed between the case and the sealing plate.

Furthermore, a connection flange may be formed on an outer peripheral edge of the sealing plate in an upwardly extending manner; the gasket is attached so as to cover an end face and inner and outer side faces of the connection flange; the sealing plate is provided in the opening of the case and the opening of the case is inwardly bent so as to cover the connection flange to seal the case.

Each of the projecting ridges may be discontinued by the opening of the case, and a position of the sealing plate may be regulated with a portion where a projecting ridge is not formed.

The formation of one or a plurality of connection projection(s) on the bottom face of the case and the sealing plate is suitable because the connection projection(s) can be used as external connection terminals.

Moreover, the electrode plate assembly are preferably constituted by laminating a positive electrode plate and a negative electrode plate with a separator interposed therebetween so that a core substrate of the positive electrode plate and that of the negative electrode plate project to sides opposite to each other; current collectors are connected to both end faces of the electrode plate assembly constituted by the edges of the core substrates of the positive and negative electrode plates; a plurality of elastic connecting pieces, being pressed against the inner bottom face of the case so as to be in contact therewith, are provided for the current collector facing the inner bottom face of the case; one or a plurality of connection projection(s) penetrating through the sealing plate with an insulating member interposed therebetween may be provided for the current collector on the opening side of the case.

The formation of one or a plurality of connection projection(s) on the bottom face of the case is suitable to connect a plurality of batteries with each other.

The projecting ridges are preferably formed with such a cross sectional shape and at such intervals that allow the side faces of the case to have sufficient strength and rigidity not to exceed a predetermined amount of deflection under influence of a predetermined internal pressure of the battery.

Furthermore, when the end faces of the electrode plate assembly, and the bottom face of the case and the sealing plate or the current collectors are welded to each other between the projecting ridges at the positions where the projecting ridges are provided, the inner spaces of the projecting ridges can be utilized.

Spaces formed between both ends of the case in a major axis direction of its cross section and the electrode plate assembly, are suitable as paths for supplying an electrolyte solution.

In a battery module according to the present invention, a plurality of the sealed rechargeable batteries described above are arranged in a row such that the bottom face of the case and the sealing plate are opposed to each other, and the connection projections provided on the bottom face of the case and the connection projections provided on the sealing plate or the connection projections penetrating through the sealing plate are welded so as to connect the rechargeable batteries in series. With this structure, a connection resistance between the batteries is small, and an internal resistance per cell is small.

Preferably, an insulating member is provided in an outer peripheral region of a gap between the bottom face of the case and the sealed portion of the rechargeable batteries connected with each other.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIGS. 8A and 8B are diagrams showing a case in another modified example of the sealed rechargeable battery, where

DETAILED DESCRIPTION OF THE PREFERRED EMBODIMENTS

First Embodiment

Hereinafter, a sealed rechargeable battery and a battery module according to a first embodiment of the present invention will be described with reference to FIGS. 1 to 6G.

Figure 1:
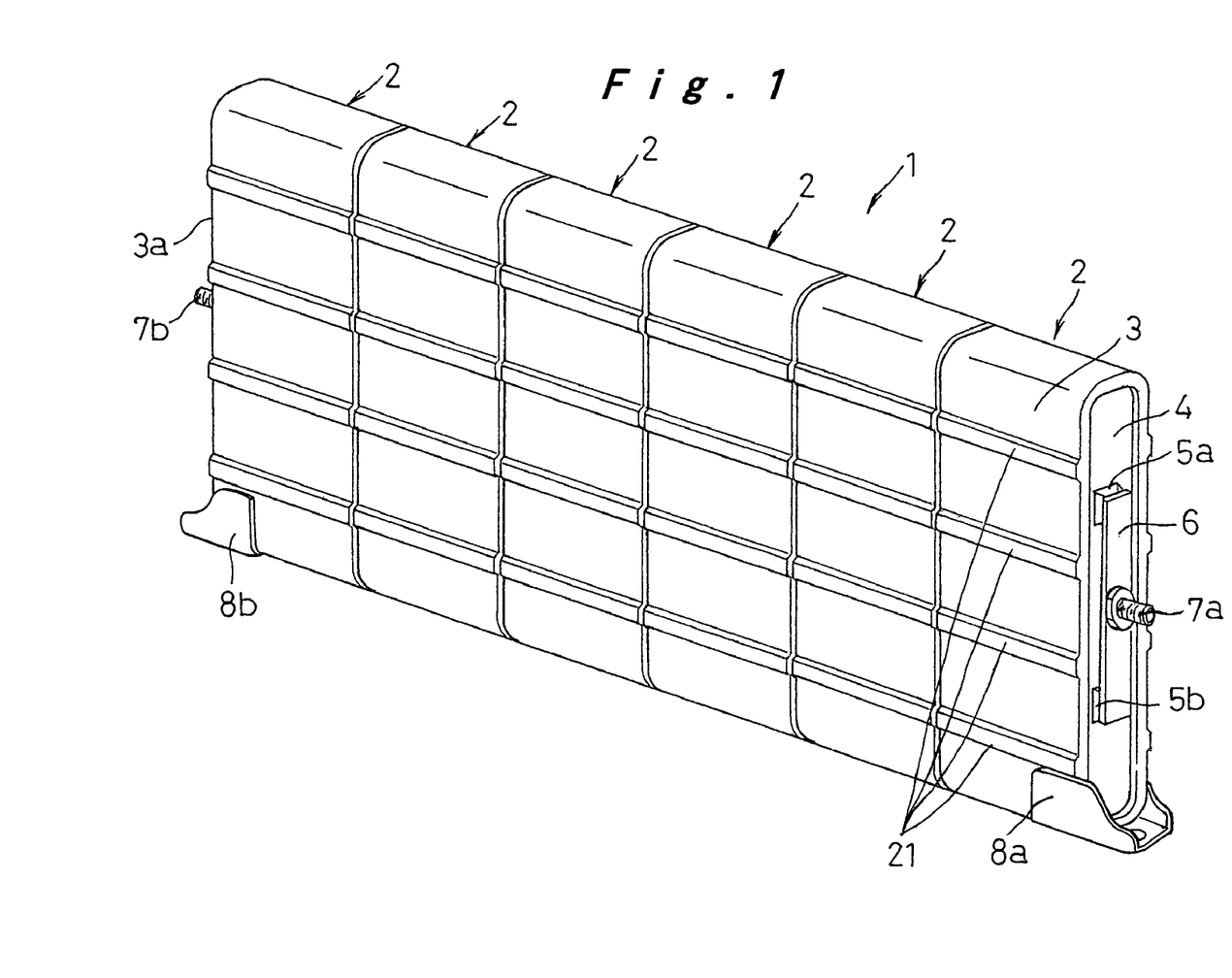
FIG. 1 is a perspective view showing the overall structure of a battery module according to a first embodiment of the present invention.
Figure 2:
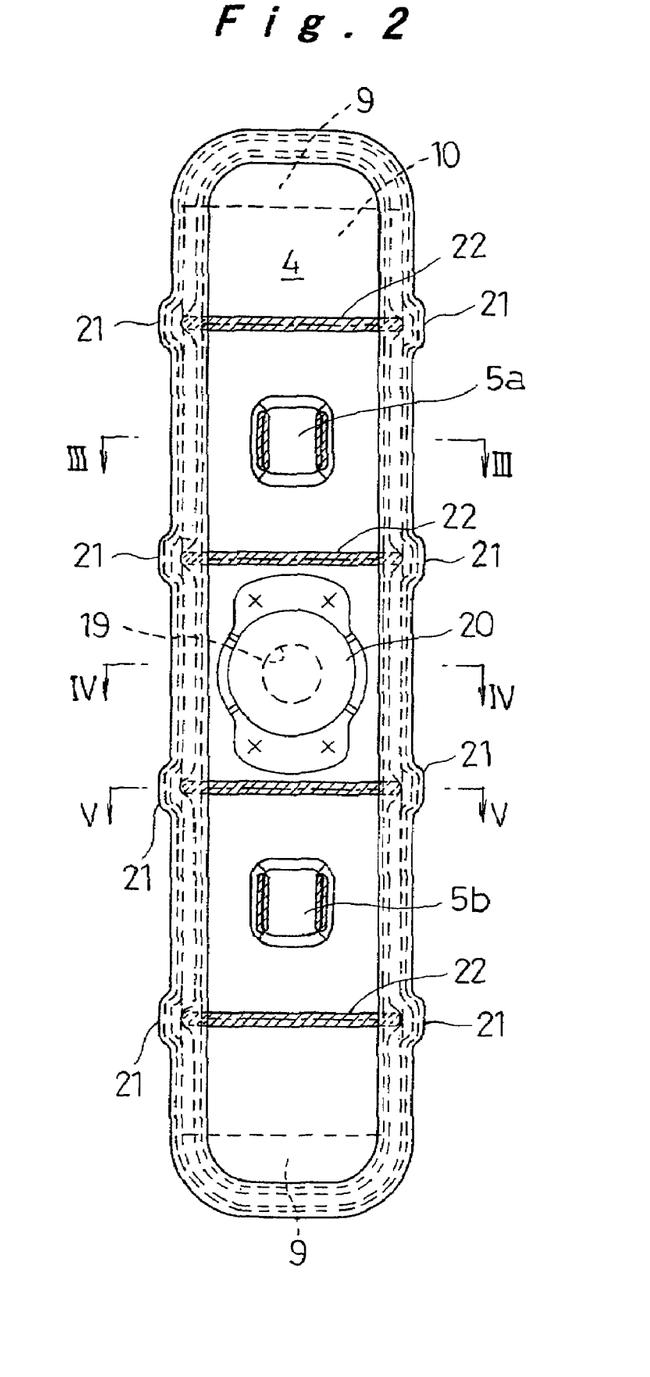
FIG. 2 is a side view of a sealed rechargeable battery according to the first embodiment.

FIG. 1 shows a battery module 1 in which a plurality of (in the illustrated example, six) sealed rechargeable batteries 2 are arranged in a row so as to be integrally and electrically connected to each other in series. Each of the sealed rechargeable batteries 2 is constituted by sealing one open end of an approximately prismatic metal case 3 having a rounded rectangular cross section with a meal sealing plate 4. Each of the case 3 and the sealing plate 4 is constituted by a steel plate plated with nickel so as to ensure the resistance against an electrolyte solution. Moreover, the sealing plate 4 is constituted by a steel plate having a large thickness so as to ensure the strength and the rigidity of the opening of the case 3.

A pair of connection projections 5a and 5b are formed on the sealing plate 4 of the sealed rechargeable battery 2 on one end of the battery module 1. A connection plate 6 having a connection terminal 7a of one polarity in its center is bridged between the connection projections 5a and 5b so as to be welded thereto. A connection terminal 7b of the other polarity is welded to the center of a bottom face 3a of the case 3 of the sealed rechargeable battery 2 on the other end. Attachment brackets 8a and 8b for attachment of the battery module 1 are fixed to the lower ends of the sealed rechargeable batteries 2 on both ends.

The sealed rechargeable battery 2 has spaces 9 on both ends in a major axis direction of its cross section in the case 3, as shown in FIGS. 2 to 5. An electrode plate assembly 10 is housed in the case 3 together with an electrolyte solution. The spaces 9 function as paths for supplying the electrolyte solution so that the electrolyte solution uniformly penetrates through the electrode plate assembly 10 to be maintained.

The electrode plate assembly 10 includes a plurality of positive electrode plates 11 and a plurality of negative electrode plates 12 that are laminated with separators 13 interposed therebetween. A core substrate 11a of the positive electrode plate 11 and a core substrate 12a of the negative electrode plate 12 are made to project toward the opposite sides. On both ends of the electrode plate assembly 10, the projecting edges of the core substrates 11a and 12a form a positive electrode end face 14 and a negative electrode end face 15, respectively. In order to enhance the reliability of a connected state with the sealing plate 4 or the bottom face 3a of the case 3, sheet-like nickel wax materials are provided on the positive electrode end face 14 and the negative electrode end face 15, respectively. The electrode plate assembly 10 may alternatively be constituted by winding band-like positive electrode plates and negative electrode plates with separators interposed therebetween around a core, then removing the core, and compressing the wound electrode plates.

The positive electrode end face 14 and the negative electrode end face 15 of the electrode plate assembly 10 are directly connected to the sealing plate 4 and the bottom face 3a of the case 3, respectively, as described below. An insulating gasket 16 is interposed between the sealing plate 4 and the case 3. On the outer peripheral edge of the sealing plate 4, a connection flange 17 is formed so as to upwardly extend. The gasket 16 having a U-shaped cross section is attached so as to cover the end face and the inner and outer side faces of the connection flange 17. Then, the sealing plate 4 is placed in the opening of the case 3. The opening of the case 3 is inwardly bent so as to cover the connection flange 17, thereby sealing the case 3.

A pair of rectangular connection projections 18a and 18b are formed on the bottom face 3a of the case 3 with an interval therebetween so as to correspond to the connection projections 5a and 5b provided on the sealing plate 4. A liquid injection port 19 for injecting the electrolyte solution is formed in the center of the sealing plate 4. After injecting the electrolyte solution, a safety vent 20 having a rubber vent 20a for sealing the liquid injection port 19 is attached to the liquid injection port 19.

A plurality of (four in the illustrated example) projecting ridges 21, each having a trapezoidal cross section, are provided on both longer side faces between the bottom face 3a and the opening in a continuous manner at intervals so as to be opposed to each other. The positive electrode end face 14 and the sealing plate 4, and the bottom face 3a of the case 3 and the negative electrode end face 15 are respectively connected to each other between the opposed projecting ridges 21 by welding portions 22 through laser beam welding, electron beam welding or the like. The connection flange 17 of the sealing plate 4 also has outwardly projecting portions so as to correspond to the projecting ridges 21. With these projecting portions, it is ensured that the welding portions 22 are formed over the full width of the positive electrode end face 14 and the negative electrode end face 15. Thereby, all of the positive electrode plates 11 and the negative electrode plates 12 are connected to the sealing plate 4 and the bottom face 3a of the case 3.

The projecting ridges 21 have such a cross section and at such intervals that allow both side faces of the case 3 to have sufficient strength and rigidity not to exceed a predetermined amount of deflection under the influence of a predetermined internal pressure of the battery.

Figure 6A:
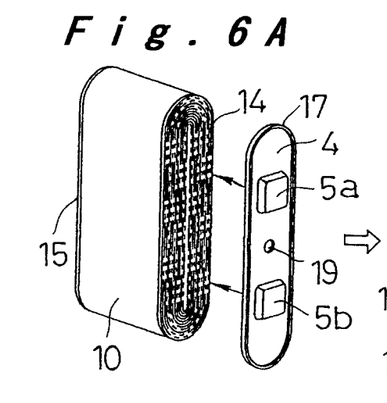
FIGS. 6A to 6G are perspective views, each showing a fabrication step of the sealed rechargeable battery according to the first embodiment.
Figure 6B:
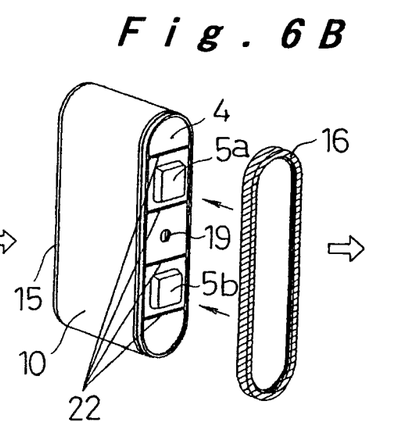
Figure 6C:
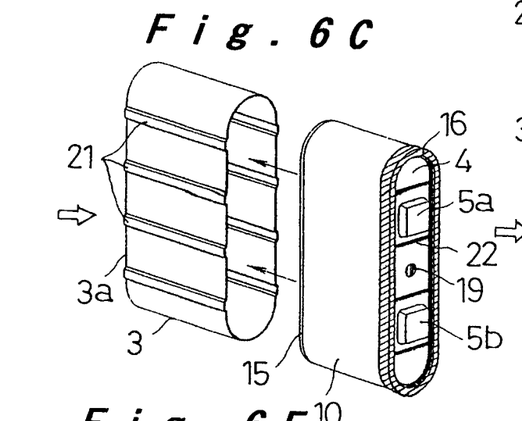
Figure 6D:
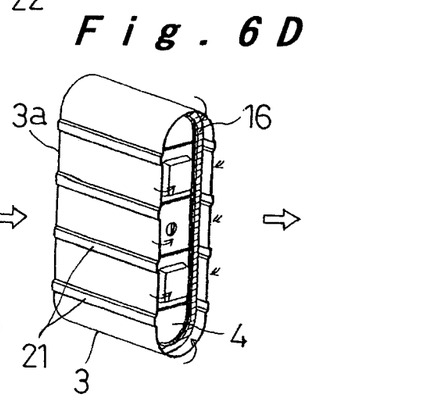
Figure 6E:
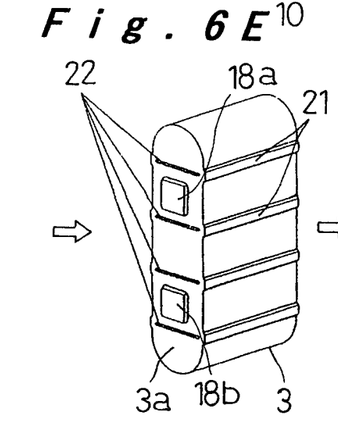
Figure 6F:
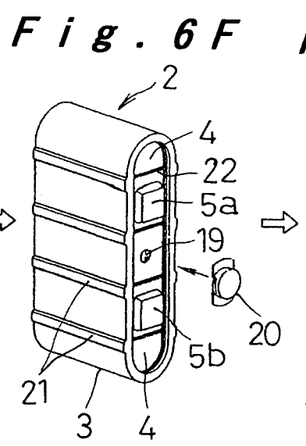
Figure 6G:
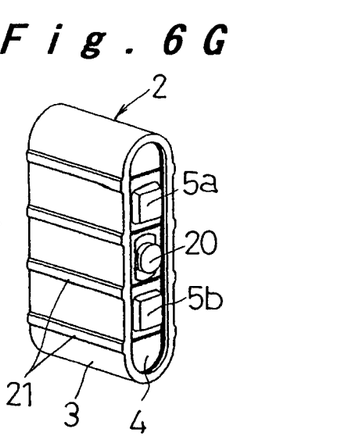

The fabrication steps of the sealed rechargeable battery 2 having the above described structure will be described with reference to FIGS. 6A to 6G. First, as shown in FIG. 6A, the sealing plate 4 is provided on the positive electrode end face 14 of the electrode plate assembly 10 (in the illustrated example, the positive electrode plates 11 and the negative electrode plates 12 are laminated with the separators 13 interposed therebetween so as to be wound) so as to face each other. Next, as shown in FIG. 6B, after the positive electrode end face 14 and the sealing plate 4 are connected to each other with the welding portions 22, the gasket 16 is attached to the connection flange 17 of the sealing plate 4. Next, after the electrode plate assembly 10 is inserted into the case 3 as shown in FIG. 6C, the opening of the case 3 is inwardly bent through the gasket 16 as indicated with an arrow so as to cover the connection flange 17 as shown in FIG. 6D, thereby sealing the opening of the case 3. Subsequently, as shown in FIG. 6E, the bottom face 3a of the case 3 and the negative electrode end face 15 are connected with the welding portions 22. Next, after injecting the electrolyte solution through the liquid injection port 19 formed in the sealing plate 4, the safety vent 20 is attached to the port 19 as shown in FIG. 6F. The sealed rechargeable battery 2 is thereby completed as shown in FIG. 6G.

Figure 3:
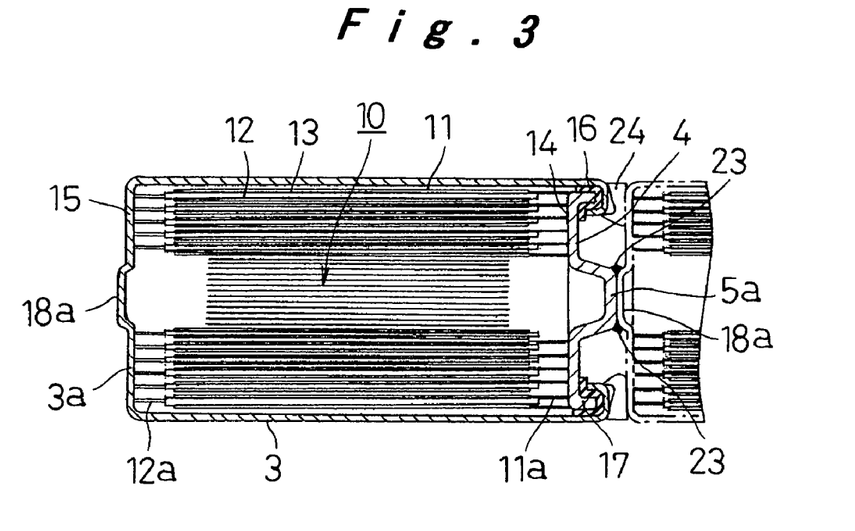
FIG. 3 is a sectional view taken along an arrow III-III in FIG. 2.
Figure 4:
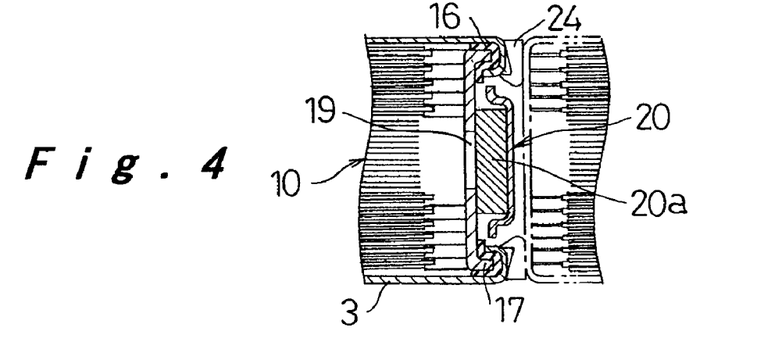
FIG. 4 is a sectional view taken along an arrow IV-IV in FIG. 2.
Figure 5:
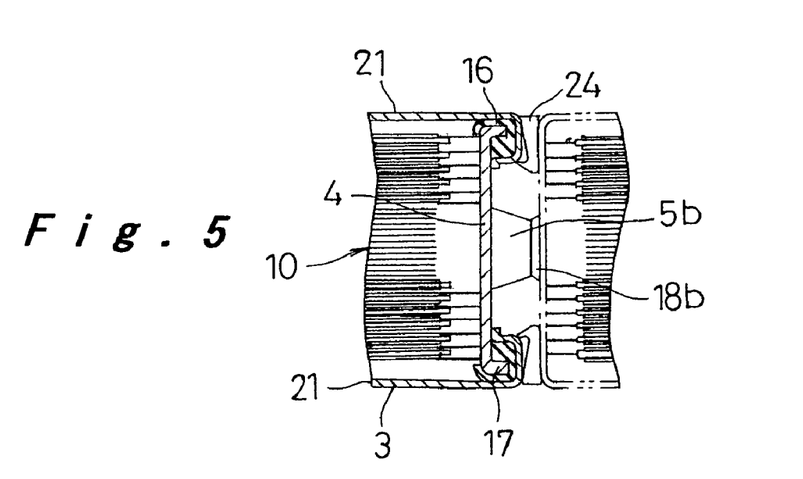
FIG. 5 is a sectional view taken along an arrow V-V in FIG. 2.

In a case of constitution of the battery module 1, in which a plurality of the sealed rechargeable batteries 2, each having the above-described structure, are connected in series, the following process is conducted. As shown in FIGS. 3 to 5 with phantom lines, the connection projections 5a and 5b on the sealing plate 4 are abutted against the connection projections 18a and 18b on the bottom face 3a of the case 3. A laser beam or an electron beam is radiated on the sides of the tips of the connection projections 5a and 18a and the connection projections 5b and 18b through a gap between the sealing plate 4 and the bottom face 3a. With welding portions 23, the sealed rechargeable batteries 2 are mechanically and electrically connected to each other in an integral manner.

An insulating member 24 is provided in an outer peripheral portion of the gap between the bottom face 3a and the sealing plate 4 of the connected rechargeable batteries 2. As a result, short-circuit, due to dusts or water penetrating into the gap between the rechargeable batteries 2, is prevented. The outer circumference of the battery module 1 is covered with an insulating film, if required.

According to this embodiment, the sealed rechargeable battery 2 has an elliptical or a rectangular cross section. Thus, in a case where a plurality of the sealed rechargeable batteries 2 are to be provided in a predetermined space, particularly in a case where the rechargeable batteries 2 are provided with a cooling path therebetween, the batteries 2 are provided at good space efficiency. The volume per battery output is thus reduced.

In addition, high cooling performance is obtained for the entire cross section of the battery because a flat outer shape of the sealed rechargeable battery 2 allows the efficient cooling to its central portion. Furthermore, since the case 3 is made of a metal, the sealed rechargeable battery 2 has a high thermal conductivity. An increased heat transfer surface, owing to the projecting ridges 21 formed on the side faces of the case 3, allows the efficient cooling. Thereby, the output characteristics and the lifetime are improved. Moreover, since a gas blocking treatment is not required as in the case of a case made of resin, the sealed rechargeable battery is fabricated at low cost with a small number of fabrication steps.

The connection projections 5a and 5b provided on the sealing plate 4 and the connection projections 18a and 18b provided on the bottom face 3a of the case 3 function as external connection terminals. A connection path between these external connection terminals and the electrode plate assembly 10 is shortened. At the same time, the number of connecting portions and a connection area are increased by achieving the connection with a plurality of the welding portions 22. As a result, the connection resistance is decreased. Moreover, since a current distribution in the electrode plate assembly 10 is uniformized so that an active material on the entire surfaces of the electrode plates uniformly reacts, the internal resistance of the sealed rechargeable battery 2 is reduced. Since the high output characteristics and high-current discharge characteristics are obtained, the output and the lifetime are increased.

The connection flange 17 is formed on the outer peripheral edge of the sealing plate 4 in an upwardly extending manner. The gasket 16 having a U-shaped cross section is fitted to the connection flange 17 so as to seal the case 3. The sealing is thereby ensured between the case 3 and the sealing plate 4. At the same time, the opening of the case 3 is supported by the connection flange 17 when the internal pressure acts. Thus, the opening of the case 3 is prevented from being deformed so as to ensure necessary pressure resistance.

With a plurality of the projecting ridges 21, both side faces of the case 3 do not expand. In a case where a battery pack is constituted by arranging a plurality of the sealed rechargeable batteries 2 in parallel with the side faces of the cases 3 being opposed to each other, it is not necessary to place any end plates on both sides of the battery pack. Accordingly, the space where the battery pack is placed can be reduced.

Although the case 3 having a rounded rectangular cross section has been exemplified in the above description, the case 3 may have an elliptical or a rectangular cross section. Moreover, as the connection projections provided on the sealing plate 4 and the bottom face 3a of the case 3, one connection projection may be provided in each center. Alternatively, three or more connection projections may be provided at appropriate intervals. Further, alternatively, the connection projections 5a and 5b or 18a and 18b may be provided on any either of the sealing plate 4 or the bottom face 3a.

Figure 7:
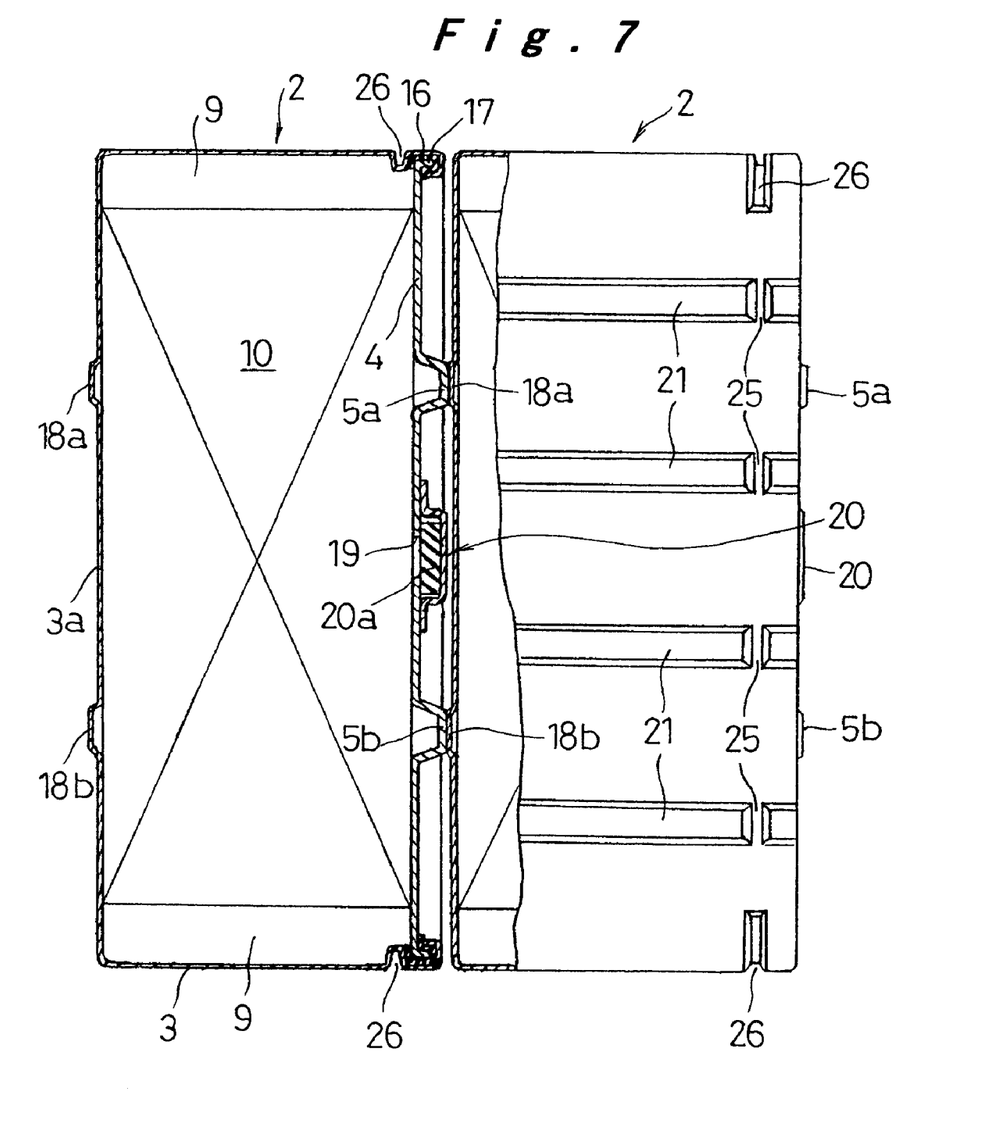
FIG. 7 is a partial sectional front view showing a modified example of the sealed rechargeable battery.

Furthermore, the following structure is preferred. As shown in FIG. 7, each of the projecting ridges 21 is discontinuously formed with the formation of a projecting ridge non-formation portion 25 on the opening of the case 3. Moreover, reentrant concave steps 26 are preferably formed at the positions in the spaces 9, corresponding to the projecting ridge non-formation portions 25 so that the position of the sealing plate 4 is regulated with the projecting ridge non-formation portions 25 and the reentrant concave steps 26. In this manner, the sealing plate 4 is accurately regulated to a predetermined position so that a correct connection state between the negative electrode end face 15 and the bottom face 3a of the case 3 is ensured.

Figure 8A:
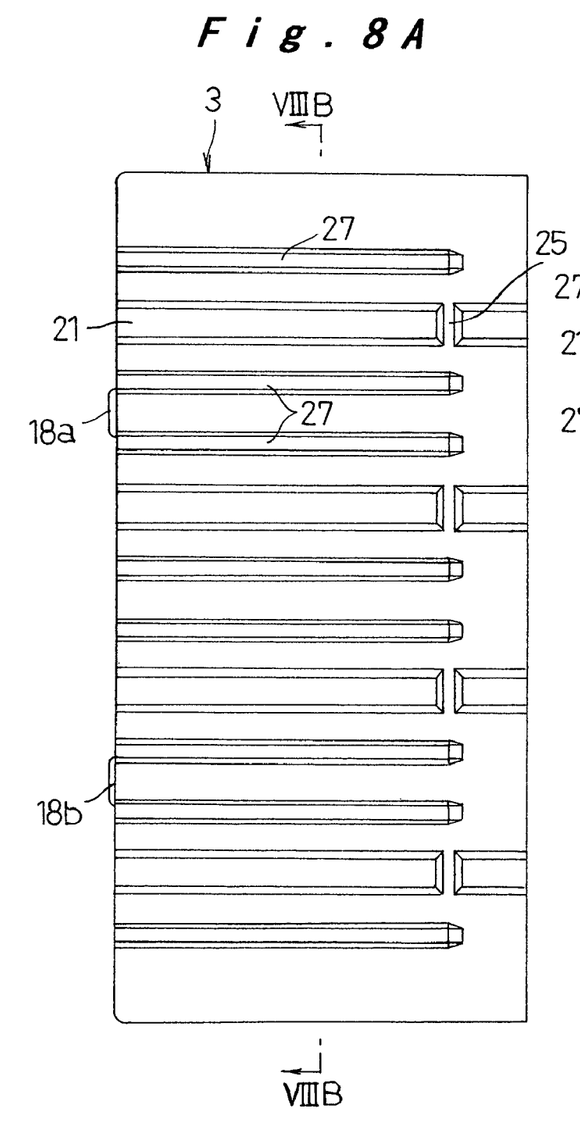
FIG. 8A is a front view thereof.
Figure 8B:
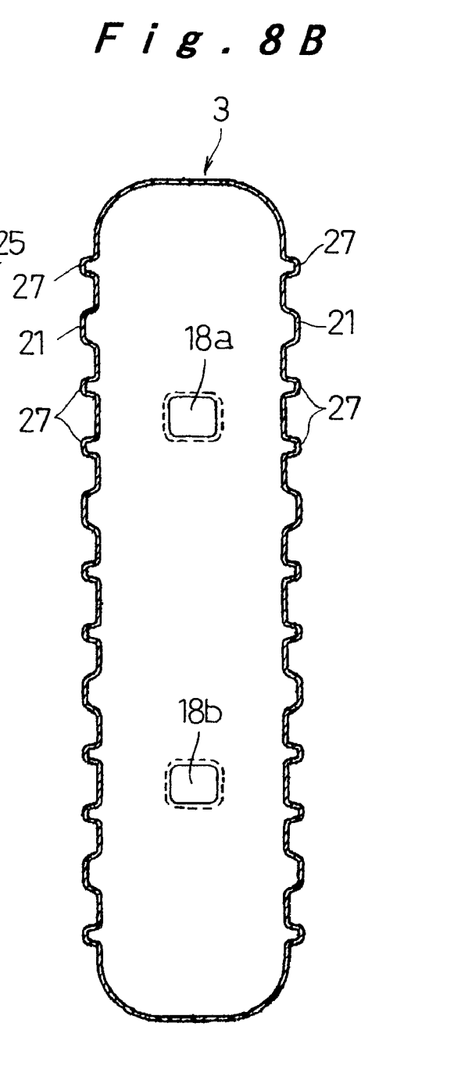
FIG. 8B is a sectional view taken along an arrow VIIIB-VIIIB in FIG. 8A.

In a case where the side faces of the case 3 cannot have required strength and rigidity by merely forming the corresponding number of projecting ridges 21 to the number of the welding portions 22, one or a plurality of reinforcing projecting ridge(s) 27 may additionally be formed between the projecting ridges 21, as shown in FIG. 8.

Second Embodiment

Next, a sealed rechargeable battery according to a second embodiment of the present invention will be described with reference to FIGS. 9 to 11E. The same components as those in the first embodiment are denoted by the same reference numerals, and the description thereof will be omitted.

Figure 9:
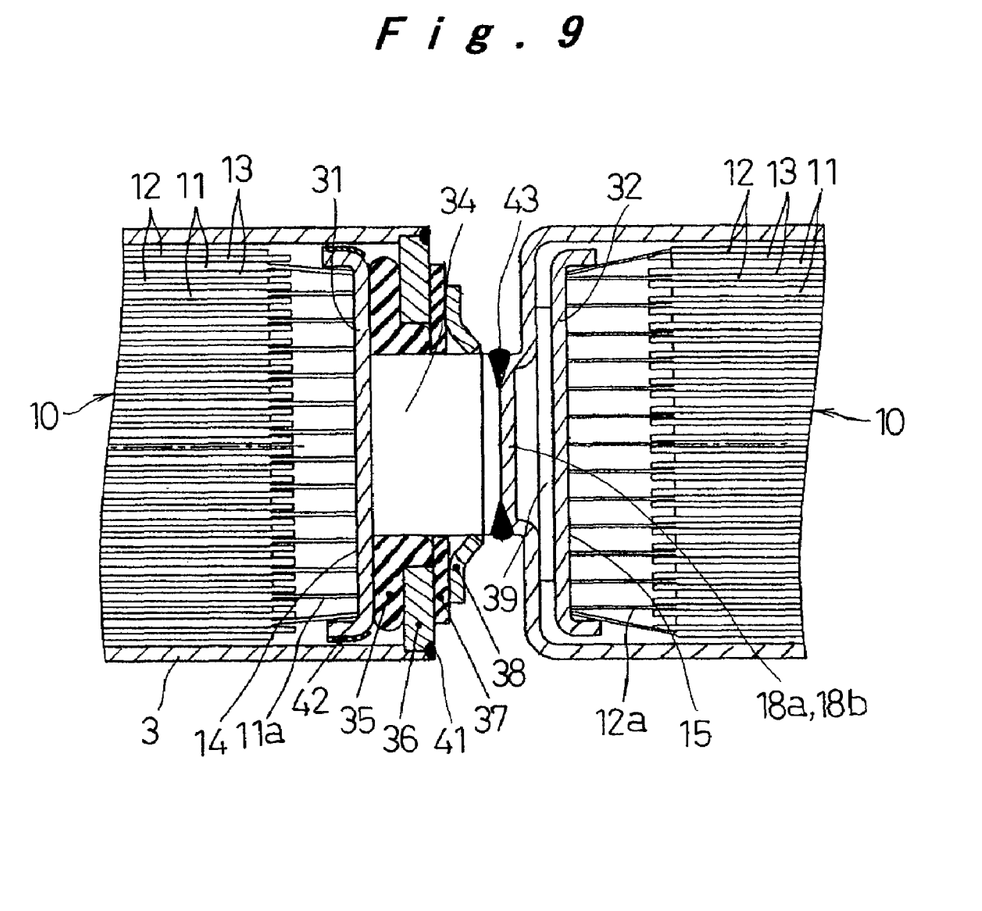
FIG. 9 is a partial sectional view showing a battery module in which sealed rechargeable batteries according to a second embodiment of the invention are connected in series.
Figure 10:
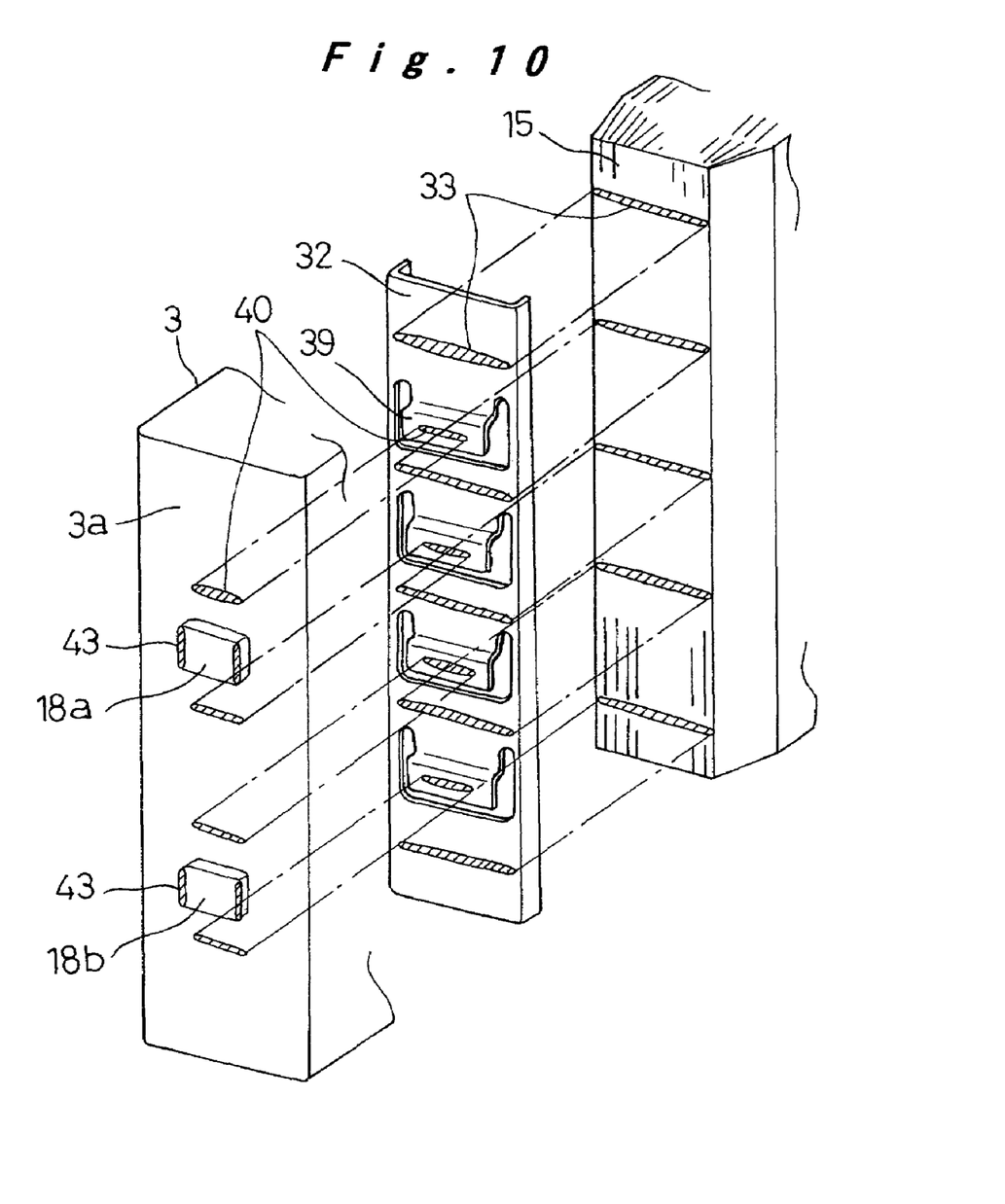
FIG. 10 is an exploded perspective view showing a connected state between a bottom face of a case, current collectors and an end face of a negative electrode of an electrode plate assembly in the second embodiment.

In this second embodiment, as shown in FIGS. 9 and 10, current collectors 31 and 32 are respectively bonded to the positive electrode end face 14 and the negative electrode end face 15 with welding portions 33 through laser beam welding or electron beam welding. In the illustrated example, the welding portions 33 are provided at five positions at appropriate intervals.

A connection projection 34 is provided for the current collector 31. The connection projection 34 penetrates a sealing plate 36 through an insulating member 35 to externally project therefrom. An engagement ring 38, which is abutted against the outer face of the sealing plate 36 through an insulating plate 37, is engaged with the outer circumference of the connection projection 34 so as to be fixed thereto. Although the connection projection 34 may be constituted by welding a component to the current collector 31, the integral formation of the connection projection 34 by press molding enables the cost reduction.

A plurality of elastic connecting pieces 39, each being formed by cutting and raising, are provided at four positions between the welding portions 33 so as to be pressed against the inner face of the bottom face 3a of the case 3 as shown in FIG. 10. Each of the elastic connecting pieces 39 and the bottom face 3a are connected to each other with a welding portion 40 by laser beam welding or electron beam welding. On the bottom face 3a, the connection projections 18a and 18b are formed at two positions between the welding portions 40 so as to correspond to the respective connection projections 34.

The sealing plate 36 is fitted into the end of the opening of the case 3 on its inner circumference. The entire circumference of the sealing plate 36 is integrally bonded to the end of the opening of the case 3 with a welding portion 41 by laser welding or the like. In order to prevent the contact between both ends of the current collector 31 and the case 3 to cause a short-circuit, insulating tapes 42 are attached to both ends of the current collector 31.

Figure 11A:
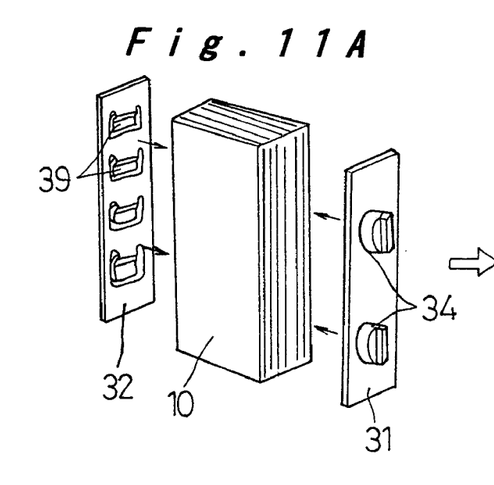
FIGS. 11A to 11E are perspective views, each showing a fabrication step of the sealed rechargeable battery according to the second embodiment.
Figure 11B:
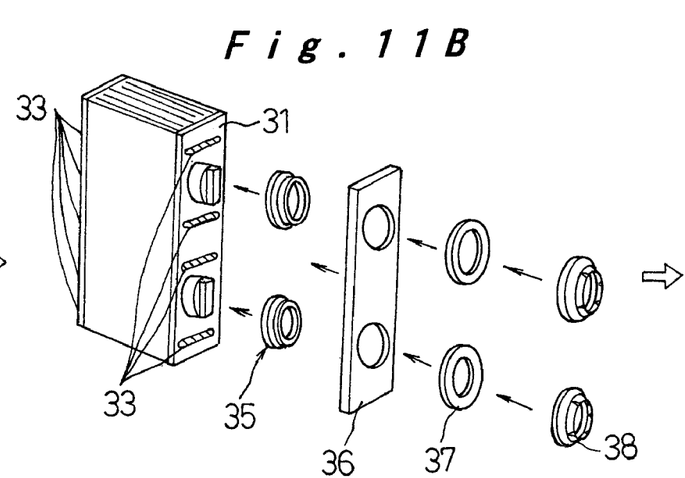
Figure 11C:
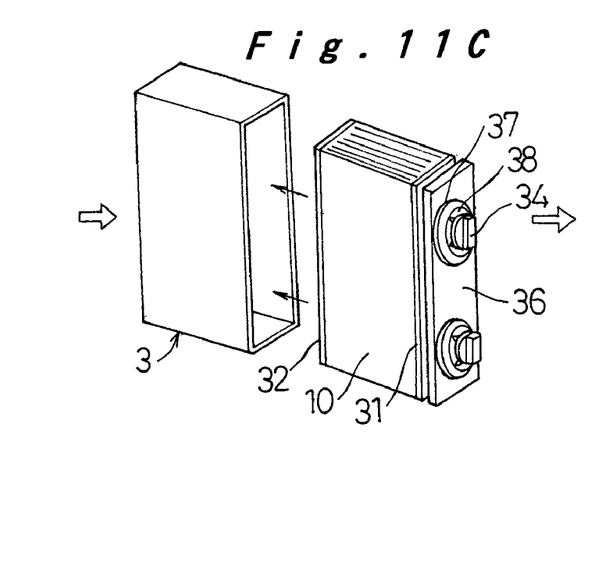
Figure 11D:
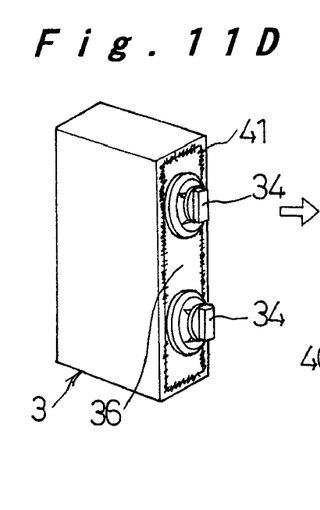
Figure 11E:
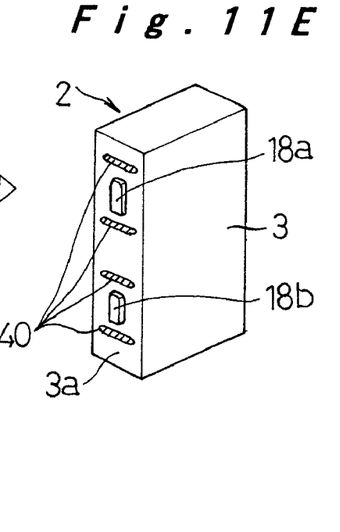

The fabrication steps of the sealed rechargeable battery 2 having the above-described structure will be described with reference to FIGS. 11A to 11E. First, as shown in FIG. 11A, the current collectors 31 and 32 are provided on the positive electrode end face 14 and the negative electrode end face 15 of the electrode plate assembly 10 so as to face each other, respectively. Next, as shown in FIG. 11B, the positive electrode end face 14 and the current collector 31, and the negative electrode end face 15 and the current collector 32 are respectively bonded with each other with the welding portions 33. After the attachment of the insulating members 35 to the connection projections 34 of the current collector 31, the engagement rings 38 are pushed against and fitted into the connecting projections 34 with the insulating plates 37 interposed therebetween so as to be engaged therewith while the sealing plate 36 is being pushed against the current collector 31. Next, the assembly of the electrode plate assembly 10, the current collectors 31 and 32 and the sealing plate 36 is placed in the case 3. The outer peripheral edge of the sealing plate 36 and the end of the opening of the case 3 are sealed with the welding portion 41 so as to achieve the sealing of the entire circumference. Thereafter, as shown in FIG. 11E, the bottom face 3a of the case 3 and the elastic connecting pieces 39 are bonded with each other with the welding portions 40 to complete the sealed rechargeable battery 2.

In a case of constitution of the battery module 1, in which a plurality of the sealed rechargeable batteries 2, each having the above-described structure, are connected in series, the following process is conducted. The connection projections 34 penetrating through the sealing plate 36 to project therefrom are abutted against the connection projections 18a and 18b on the bottom face 3a of the case 3. A laser beam or an electron beam is radiated on the sides of the tips of the connection projections 34 and 18a and the connection projections 34 and 18b through a gap between the sealing plate 36 and the bottom face 3a. With welding portions 43, the sealed rechargeable batteries 2 are mechanically and electrically connected to each other in an integral manner.

According to this embodiment, the bottom face 3a of the case 3 and the negative electrode end face 15 are connected with each other through the current collector 32 provided with the elastic connecting pieces 39 with high reliability. Moreover, since the connection projections 34 serving as external connection terminals are provided for the current collector 31 connected to the positive electrode end face 14, the connection projections 34 and the case 3, and the positive electrode end face 14 and the negative electrode end face 15 are respectively connected with each other through the current collectors 31 and 32 and a small contact resistance. Thus, the internal resistance of the battery is reduced.

Furthermore, in the above-described embodiment, the connection projections 18a and 18b are formed on the bottom face 3a of the case 3. A plurality of the sealed rechargeable batteries 2 are arranged so that the bottom face 3a and the sealing plate 36 face each other, and the welding portions 43 are formed by lateral laser beam welding or electron beam welding on the connection projections 34 and 18a and 18b through the gaps between the batteries. As a result, a battery module, in which a plurality of the sealed rechargeable batteries 2 are mechanically connected with each other in an integral manner and are electrically connected in series, is easily obtained.

According to the sealed rechargeable battery of the present invention, since a cross section of the case is elliptical or rectangular, a larger number of the rechargeable batteries can be placed with a cooling path being formed between the rechargeable batteries as compared with a battery having a circular cross section. At the same time, since each of the batteries is efficiently cooled to its central portion, the volume efficiency per battery output is increased. Furthermore, since a plurality of the projecting ridges are formed in a continuous or discontinuous manner on the both longer side faces of the case between the bottom face and the opening, the strength of the side faces is increased. As a result, the side faces are prevented from being expanded due to an internal pressure of the battery.

Thus, even in a case where a battery pack is constituted by arranging a plurality of batteries so that the side faces of the case face each other, it is not necessary to provide any end plates on both sides of the battery pack. The space in which the battery pack is placed is reduced.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A sealed rechargeable battery, comprising:
   a metal case having an elliptical or rectangular cross section;
   a metal sealing plate for sealing an opening at one end of the case; and
   an electrode plate assembly, the electrode plate assembly being housed in the case together with an electrolyte solution, both longer side faces of the case including continuous or discontinuous projecting ridges which are disposed in opposed respective positions of said side faces between a bottom face opposite to the opening and said opening, said projecting ridges extending to the bottom face and to the opening;
   wherein said electrode plate assembly includes positive and negative electrode end faces, one of the electrode end faces and the sealing plate are connected to each other by welding portions between the opposed projecting ridges, and the bottom face of the case and the other electrode end face are connected to each other by welding portions between the opposed projecting ridges and
   a periphery of said sealing plate includes outwardly projecting portions corresponding to the projecting ridges whereby said welding portions are formed over substantially a full width of the positive and negative electrode faces.

2. The sealed rechargeable battery according to claim 1, wherein:
   the electrode plate assembly is constituted by laminating a positive electrode plate and a negative electrode plate with a separator interposed therebetween such that a core substrate of the positive electrode plate and a core substrate of the negative electrode plate project to sides opposite to each other;
   both end faces of the electrode plate assembly, constituted by edges of the core substrates of the positive electrode plate and the negative electrode plate, are connected to the bottom face of the case and the sealing plate; and
   an insulating gasket is interposed between the case and the sealing plate.

3. The sealed rechargeable battery according to claim 2, wherein:
   a connection flange is formed on an outer peripheral edge of the sealing plate in an upwardly extending manner;
   the gasket is attached so as to cover an end face and inner and outer side faces of the connection flange; and
   the sealing plate is provided in the opening of the case, and the opening of the case is inwardly bent so as to cover the connection flange to seal the case.

4. The sealed rechargeable battery according to claim 3, wherein each of the projecting ridges has a discontinuity near the opening of the case forming a projecting ridge non-formation portion, whereby a position of the sealing plate is regulated by the projecting ridge non-formation portion.

5. The sealed rechargeable battery according to claim 1, wherein at least one connection projection is formed on the bottom face of the case and the sealing plate.

6. The sealed rechargeable battery according to claim 1, wherein:
   the electrode plate assembly is constituted by laminating a positive electrode plate and a negative electrode plate with a separator interposed therebetween such that a core substrate of the positive electrode plate and a core substrate of the negative electrode plate project to sides opposite to each other;
   current collectors are connected to both end faces of the electrode plate assembly, constituted by edges of the core substrates of the positive electrode plate and the negative electrode plate;
   elastic connecting pieces, being pressed against the bottom face of the case so as to be in contact therewith, are provided for the current collector facing the bottom face of the case; and
   at least one connection projection penetrating the sealing plate through an insulating member is provided for the current collector on the opening side of the case.

7. The sealed rechargeable battery according to claim 6, wherein at least one connection projection is provided on the bottom face of the case.

8. The sealed rechargeable battery according to claim 1, wherein intervals of the projecting ridges and a cross section thereof are selected to impart sufficient strength and rigidity to the side faces of the case to inhibit a predetermined amount of deflection at a minimum under influence of a predetermined internal pressure of the battery.

9. The sealed rechargeable battery according to claim 2 or 6, wherein the end faces of the electrode plate assembly and the bottom face of the case and the sealing plate or the current collectors are welded to each other between the projecting ridges at the positions where the projecting ridges are provided on both side faces.

10. The sealed rechargeable battery according to claim 1, wherein spaces are formed between both ends of the case in a major axis direction of its cross section and the electrode plate assembly, respectively.

11. A battery module including a plurality of the sealed rechargeable batteries according to claim 5 or 7, wherein:
   the sealed rechargeable batteries are arranged in a row such that the bottom face of the case and the sealing plate face each other; and
   the connection projections provided on the bottom face of the case and the connection projections provided on the sealing plate or the connection projections penetrating the sealing plate to project beyond the sealing plate are welded so as to connect the sealed rechargeable batteries with each other, whereby the projecting ridges are disposed along external exposed sides faces of the battery module.

12. The battery module according to claim 11, wherein an insulating member is provided in an outer peripheral region of a gap between the bottom face of the case and a sealed portion of the sealed rechargeable batteries connected with each other.

13. A sealed rechargeable battery, comprising:
   a case including an end face and an opening at an opposite end of the case, and further including opposed first and second side faces, a case axis extending through said end face and said opposite end;
   a sealing plate for sealing said opening; and
   an electrode plate assembly housed in the case, said first and second side faces of the case including projecting ridges arranged codirectionally with said case axis and which are disposed in opposed respective positions of said first and second side faces between said bottom face and said opening in said opposite end, end portions of said projecting ridges extending to the bottom face and to the opening;
   wherein said electrode plate assembly includes positive and negative electrode end faces, one of the electrode end faces and the sealing plate are connected to each other by welding portions between the opposed projecting ridges, and the bottom face of the case and the other electrode end face are connected to each other by welding portions between the opposed projecting ridges and
   a periphery of said sealing plate includes outwardly projecting portions corresponding to the projecting ridges whereby said welding portions are formed over substantially a full width of the positive and negative electrode faces.

14. The battery module according to claim 13, wherein said projecting ridges are discontinuous between said end face and said opposite end.

15. The battery module according to claim 13, wherein said projecting ridges have a trapezoidal cross-sectional shape.

* * * * *